United States Patent Office 3,480,696
Patented Nov. 25, 1969

3,480,696
ALPHA OLEFIN BLOCK COPOLYMERS AND
THEIR PREPARATION
Howard L. Hassell, San Leandro, and Roy G. Hayter,
Berkeley, Calif., assignors to Shell Oil Company, New
York, N.Y., a corporation of Delaware
No Drawing. Filed Nov. 16, 1966, Ser. No. 594,696
Int. Cl. C08f 15/04
U.S. Cl. 260—878        6 Claims

ABSTRACT OF THE DISCLOSURE

Block copolymer of alpha olefins having highly isotactic plastic blocks and highly random elastomeric copolymers blocks are prepared by the use of a catalyst system comprising gamma titanium trichloride and a dialkyl hydrocarbyloxy aluminum. The copolymers are especially useful as elastomers which do not require vulcanization.

---

This invention relates to improved block copolymers of certain alpha olefins. More particularly it is concerned with the preparation of products having the characteristic of vulcanized polymers.

The polymerization of alpha olefins can lead either to product having the characteristics of thermoplastics such as polyethylene or polypropylene or to elastomers such as ethylene-propylene rubbers. Such materials are greatly affected by the specific catalyst system used insofar as the stereo regularlity of the product is concerned. The configuration of the products largely control the physical properties.

Block copolymers of alpha olefins have been produced by the periodic injection of several types of alpha olefins into the polymerization mass resulting in block copolymers having properties somewhat different from random copolymers achieved by polymerization of mixtures of the two monomers. However, the products so obtained are either those of the thermoplastic type or of the elastomeric type requiring vulcanization to achieve their maximum stress-strain properties. The preparation of high impact olefin polymers has been achieved recently by the so-called tail blocking process wherein a block of an elastomeric olefin copolymer is directly attached to one terminal of an alpha olefin polymer such as polypropylene or the like.

With the advent of isotactic polypropylene, efforts were made to obtain olefin block copolymers in which the isotactic polypropylene blocks could be present. However, unfortunately it was found that when a catalyst system was utilized which maximized the isotacticity of propylene polymer blocks, the catalyst was not suitable for the formation of an elastomeric olefin polymer block having a structure suitable for optimum physical properties thereof.

It would be of special benefit to obtain alpha olefin polymers having optimum elastomeric properties without the necessity of vulcanizing or, on the other hand, to improve the properties of thermoplastic copolymers to a maximum extent.

It is an object of the present invention to improve the block copolymerization of alpha olefins. It is a particular object of the invention to provide an improved process and catalyst system for the production of improved block copolymers of alpha olefins. It is a special object of the invention to provide an improved self-vulcanizing alpha olefin block copolymer. Other objects will become apparent during the following detailed description of the invention.

Now in accordance with the present invention new compositions of matter are provided comprising a block copolymer having the general configuration A-B-A wherein each A is slightly isotactic polymer block of an alpha olefin of the group consisting of propylene and $C_{5-12}$ alpha olefins, each block A having a crystallization temperature above about 125° C., and B is a highly random copolymer block of ethylene with at least one alpha olefin having 3–12 carbon atoms per molecule, said copolymer block showing essentially a single absorbance in the infrared wave length region between about 13.5 and 14.0 microns, the A-B-A block copolymer being substantially insoluble in normal heptane at 20° C.

Still in accordance with the present invention a method of producing such block copolymers is provided which comprises the following steps:

(1) Homopolymerization of alpha olefin of the group consisting of propylene and $C_{5-12}$ alpha olefins by contact with a catalyst consisting essentially of gamma titanium trichloride and a dialkyl hydrocarbyloxy aluminum having a titanium:aluminum mole ratio between about 1:1 and 1:8;

(2) Thereafter continuing the polymerization by copolymerizing a mixture of ethylene and at least one alpha olefin having 3–12 carbon atoms per molecule;

(3) And thereafter continuing the polymerization by homopolymerizing an alpha olefin of the group consisting of propylene and alpha olefin having 5–12 carbon atoms per molecule.

The type of catalyst employed for the production of the alpha olefin block copolymers of the invention is of essential importance in obtaining the desired structure wherein thereby the desired properties in the product. It was found that the usual Ziegler catalyst systems comprising titanium halides in conjunction with either aluminum halides or aluminum organo halides while providing products satisfactory for many purposes did not combine the desired features of providing both a highly isotactic end block in conjunction with a highly elastomeric copolymer center block. Consequently, one of the important aspects of the present invention was the discovery of the means for providing such a structure by utilizing the catalyst system referred to hereinbefore.

The gamma titanium trichloride may either be prepared in situ or previously prepared in an inert hydrocarbon suspension. Preferably, the gamma titanium trichloride is prepared by admixture of titanium tetrachloride with an aluminum trialkyl in such a proportion as to provide gamma titanium trichloride containing essentially no titanium derivatives having a lower valance than three. Preferred conditions for the preparation of gamma titanium trichloride comprised dispersal of titanium tetracloride in an inert hydrocarbon such as a hydrocarbon having from about 3 to 12 carbon atoms per molecule, preferably 4–8 carbon atoms per molecule and thereafter incrementally adding an aluminum alkyl thereto, the mole ratio of titanium to aluminum being of the order of 0.25–0.50, preferably 0.30 to about 0.40. The addition of the two components is made at temperatures ranging from about 0 to 50° C., preferably between about +10 and 40° C. and room temperature is convenient and preferred. Thereafter the reaction mixture is heated at a temperature between about 100 and 200° C. preferably between about 140 and 180° C. for periods of time ranging from about 10 minutes to 4 hours, preferably between about ½ hour and 2 hours. The gamma titanium trichloride thus formed is then in condition for utilization in the process of the present invention.

The aluminum trialkyl which may be employed in the preparation of gamma titanium trichloride preferably has from 1–12 carbon atoms in each of the alkyl radicals and preferably between about 2 and 6 carbon atoms per alkyl radical. Suitable trihydrocarbyl aluminums include those in which all of the radicals are identical or mixed radicals may be employed. Typical aluminum alkyls include triethyl aluminum, trimethyl aluminum, tripropyl aluminum, triisopropyl aluminum, tributyl aluminum, triisobutyl, tritert-butyl aluminum, trihexyl aluminums, trioctyl aluminums, etc. Mixtures of aluminum alkyls may be utilized as well as a single species of aluminum alkyl. Aryl aluminums are contemplated in addition to alkyl species.

The successful production of the block copolymers having the desired structure discussed more fully hereinafter lies in the use of the cocatalyst together with the gamma titanium trichloride, the cocatalyst being dialkyl alkoxy aluminum. The alkyl radicals present in these compounds are those having from 1–12 carbon atoms per molecule and all of the alkyl radicals may be identical or mixed alkyls may be utilized. Aryl substituted species may be substituted when desirable. Moreover a single species of the cocatalyst may be employed or mixtures of several species may be employed for this purpose. Suitable species include diethylethoxy aluminum, diethylisopropoxy aluminum, dipropylethoxy aluminum, dibutylethoxy aluminum, dibutylisobutoxy aluminum, butylethylethoxy aluminum, diisopropylhexoxy aluminum, and the like. Preferably the proportion of cocatalyst is in substantial excess on a molar basis relative to the gamma titanium trichloride, but equimolar proportions may be employed thus the preferred titanium:aluminum mole ratio lies between about 1:1 and 1:8, more preferably, however, the molar ratio is between about 1:2 and 1:4.

The block copolymerization is conducted in the presence of an essentially inert hydrocarbon solvent, this term being utilized with reference to the conditions encountered during the polymerization procedure. Thus, alkanes and cycloalkanes such as butanes, pentanes, hexanes, cyclohexane, and other saturated hydrocarbons having from 4–10 carbon atoms per molecule are preferred solvents for this purpose. Aromatic solvents such as benzene or toluene also may be used.

The polymerization is conducted under conditions which will avoid inadvertent termination of the growing polymer change. This temperature is usually between about −25° C. and +100° C., the preferred range being about −5 to +40° C. If lower polymerization temperature is utilized, the polymerization proceeds at a slow rate, while if the temperatures are excessive then thermal termination of the growing polymer chain is apt to occur.

In achieving success in the present invention it is essential that the polymerization of the initial homopolymer block be conducted under such circumstances and with the above catalyst that a substantial proportion (over 50%) of a highly isotactic polymer block is obtained. The first olefin injected into the polymerization system therefore is of the group consisting of propylene and alpha olefins having from 5 to 12 carbon atoms per molecule; propylene is preferred. The polymerization is conducted either with the total amount of alpha olefin monomer present for the formation of this first polymer block or an initial amount which is incrementally supplemented during the polymerization period. It has been found that optimum physical properties in the final product are obtained when this initial homopolymer isotactic block is allowed to polymerize to an average intrinsic viscosity as measured in Decalin at 150° C. between about 0.05 dl./g. and 2.0 dl./g., preferably between about 0.1 dl./g. and 0.8 dl./g., especially if an elastomeric end product is desired. If the average molecular weight of each block A is outside of this specified range, the properties of the whole product are altered. The product is a thermoplastic having too high a softening point or in the direction of an ordinary ethylene-propylene rubber which would require vulcanization.

Having formed the first homopolymeric block, which is thermoplastic rather than elastomeric, the block polymerization is continued without killing the catalyst or terminating the polymerization. The alpha olefin utilized for the formation of this first block is either swept out and replaced with two alpha olefins, or any remaining monomer is supplemented by a different alpha olefin. The proportions are adjusted to those desired for the formation of the elastomeric copolymer block of ethylene with at least one other alpha olefin having from 3 to 12 carbon atoms per molecule. The present catalyst system has been found to provide not only a highly isotactic homopolymer first block but an outstanding elastomeric copolymer second block. In order to maintain the desired degree of high elasticity, this copolymeric center block should have an ethylene content between about 20 and 90% by weight, the percentage being chosen with respect to the second monomer with which the ethylene is to be copolymerized.

In order to achieve the desired self-curing properties of the eventual copolymer, it is necessary to adjust the intrinsic viscosity (in Decalin at 150° C.) of this elastomeric copolymeric block to between 0.7 and 5.0 dl./g., preferably 0.9–3.0 dl./g.

Following the formation of this copolymer block and without termination of the polymerization or killing of the catalyst, the second thermoplastic block A is created by sweeping out the remainder of block B monomers and replacing them with a block A monomer which may be the same or different from the alpha olefin utilized in the formation of the initial homopolymeric block. Block polymerization is continued as described hereinbefore to form the desired average molecular weight which is within the range specified for the initial block A.

The product of the block copolymerization is thereafter utilized in the form of a cement or may be recovered by coagulation or precipitation preferably after purification from catalyst residues by methods known in the art such as by treatment with alcoholic HCl and washing with water.

The product obtained by the process of the present invention as described above preferably comprises a major proportion of the polymer having the general structure A-B-A wherein each A is a highly isotactic thermoplastic homopolymeric alpha olefin block and B is a highly elastomeric alpha olefin copolymer block. As noted hereinbefore, the isotacticity of the thermoplastic blocks is defined by having a crystallization temperature above 150° C. and preferably between about 150 and 250° C. The highly random elastomeric center copolymer block is defined as having essentially no absorbences in those regions of the infrared spectrum normally associated with crystallinity of sequences of at least one of co-monomers. For instance, in the case of a poly(ethylene-propylene) center copolymer block, a random elastomeric center block is defined as having essentially only a single absorbence in the infrared wave length region between about 13.4 and 14.2 microns and either a very weak or no absorbence in the wave length region between about 9.9 and 10.1 microns. By a "single absorbence" is meant an infrared spectrum within the defined wave length range showing only a single well defined maximum. Shoulders on the slopes of the absorbence are not regarded as maxima which, for the present purposes, may be ignored. Poly(ethylenepropylene) copolymers which show two absorbences in the wave length region from 13.4 to 14.2 microns contain relatively long sequences of ethylene, and usually are not as elastomeric as those copolymers which show essentially only a single absorbence.

While the ideal product, therefore, is one having only the above type of block copolymer, under commercially realistic conditions it will be understood that the total reaction product aside from solvent will comprise a major proportion of the desired block copolymer and a minor proportion of an analog or homolog of such copolymer having less desirable properties. For example, the percentage of isotacticity in the terminal homopolymeric block may be less than ideal and the center copolymer block may not have as high a degree of random structure as in the desired end product. Nonetheless the mixtures of these two types of polymers find many outstanding industrial utilities and may be used as such without further fractionation if desired. However, if the maximum of physical properties is desired, then the two types of polymers may be easily separated by their different solubility characteristics. Thus they may be separated either by precipitation techniques or by extraction techniques or a combination of the same. The desired products having the isotactic end blocks and the highly random center block are found to be essentially insoluble in normal heptane at 20° C. On the other hand, the polymers which may be produced in a minor amount at the same time, but having a lesser amount of isotacticity are found to be soluble in varying degrees in normal heptane at 20° C. Thus, it will be seen that the separation may be effected by extraction with normal heptane at a temperature around room temperature if desired and it will be realized by experts in the art that other normally liquid or liquefied normally gaseous hydrocarbons may be employed in modifying the extraction or precipitation procedures. Also the temperature may be varied within practical limits to effect a removal of any desired fraction out of the total reaction product.

The block copolymers of the present invention will vary in their overall properties dependent primarily not only upon the individual molecular weights of the several types of blocks, but also upon the proportion of elastomeric blocks to thermoplastic homopolymeric blocks. Thus the polymers may be either clearly thermoplastic elastomers or may be high impact thermoplastic polymers, but it will be understood that there will be a progression of changes in physical properties covering this whole gamut from elastomers to bona fide thermoplastics. However, it can be said that the presence of highly isotactic end homopolymeric blocks combined with the highly random highly elastomeric copolymeric center blocks results in a maximum combination of desirable properties either with respect to high impact thermoplastics or with respect to thermoplastic elastomers. The term "thermoplastic elastomers" is used especially with reference to the self-vulcanizing feature of these particular polymers since within the proportions given hereinafter it has been found that vulcanization is essentially unnecessary to obtain the maximum physical properties desired with respect to stress-strength. Also, due to the structure referred to hereinbefore, the polymers are largely solvent resistant and are therefore applicable for their purposes where fully soluble polymers or solvent sensitive polymers could not be used. Thermoplastic elastomers falling within the scope of the present invention usually comprise those having between about 30% and about 90% of an elastomeric copolymeric center block. Within this copolymeric center block it is preferred that ethylene comprise between about 25% and about 85% by weight of the two alpha olefin monomers which are copolymerized therein. When the properties of a high impact thermoplastic polymer is desired, it is preferred that the elastomeric center block comprise between about 2% and about 30% by weight of the entire polymer and, in this particular situation, the elastomeric center block may comprise between about 25% and about 85% by weight of the two alpha olefin monomers comprising this center block.

The block copolymers of this invention may be used for a wide variety of molding operations utilizing equipment normally employed for the molding of thermoplastic materials. In addition, of course, and dependent upon their elastomeric character, they may be processed in equipment normally employed for the processing and shaping of elastomeric substances. The compositions may be modified with flow assist agents or extenders such as lubricating oil. It is preferred to restrict the use of such materials so as to maintain maximum stress-strain properties in the finished compositions. Fillers may be employed if desired such as those utilized with ordinary rubbers or thermoplastic polymers. They may be further modified by the presence of asphalt, wax, polyvinyl compounds such as polystyrene, ordinary polymers of alpha olefin such as polypropylene, polyethylene or ethylene-propylene rubbers as well as with natural or synthetic rubbers such as polyisoprene or polybutadiene as well as copolymers having elastomer properties such as styrene-butadiene copolymers. In combination with ordinary homopolymers or copolymers of alpha olefins the present block copolymers impart properties heretofore unrealized to their maximum extent particularly with respect to elastomeric properties or with respect to high impact properties. Due to their chemical structure, the subject copolymers are highly compatible with ordinary polymers of alpha olefins. They may be employed for the formation of industrial materials such as shoes, shoe components such as shoe soleing, sporting goods such as aquatic fins and masks, elastomeric threads, laminates with polyolefins or other polymers, films, latices for use in dipping, bottle closure seals such as crown cap liners and the like and for other known purposes.

The following examples illustrate a preferred process for the preparation of the subject block copolymers, typical of which are polymers having the structure polypropylene-(ethylene-propylene copolymer)-polypropylene in which the polypropylene groups have a highly isotactic structure and the ethylene-propylene copolymer block has a highly random structure.

EXAMPLE I

A block copolymer having the structure polypropylene-(ethylene-propylene copolymer)-polypropylene was prepared in 1800 cc. heptane solvent utilizing as the catalyst components 10.8 millimoles gamma titanium trichloride per liter and 30.4 millimoles of diethylethoxy aluminum per liter. The polymerization was conducted at about 0° C. under 5 p.s.i.g. pressure. Propylene was introduced into the reactor at a rate of 0.038 mole per minute for 15 minutes and resulted in the formation of a homopolypropylene block having an intrinsic viscosity of 1.4 dl./g. in an amount of 0.3% weight solid based on the total reaction mixture. Thereafter the flow of polypropylene was continued at the same rate and ethylene was also introduced at a rate of 0.038 mole per minute. The copolymerization was continued for 60 minutes and resulted in a polymer product having an intrinsic viscosity of 4.3 dl./g., the amount of polymer amounting to 10.1% by weight of the total reaction mixture. After a nitrogen purge to remove the unreacted monomers, the third block, namely, a terminal block of homopolypropylene was produced by introduction of propylene at the original rate of 0.038 mole per minute until the intrinsic viscosity of the polymer was about 5.6 and the total polymer weight was 12.5% by weight of the total reaction mixture. 33.3% of the entire polymer was soluble in normal heptane at room temperature. The physical properties of the whole polymer, the soluble portion thereof and the desired insoluble block copolymer were obtained and are given in the table below:

TABLE I

| Polymer | I.V., dl./g. | Tensile Properties at Break [1] | | | Modulus | |
| --- | --- | --- | --- | --- | --- | --- |
| | | Strength, lbs./in.$^2$ | Elongation, percent | Set, percent | 300%, lbs./in.$^2$ | 500%, lbs./in.$^2$ |
| Whole | 4.3 | 2,200 | 825 | 160 | 525 | 800 |
| Soluble | 2.1 | 55 | 2,700 | 440 | 40 | 40 |
| Insoluble | 6.2 | [2] 3,990 | 540 | 160 | 1,225 | 200 |

[1] Tensile properties tested at room temperature.
[2] Specimen molded at 200° C.

Infrared spectra of the insoluble block copolymer indicated that it had highly isotactic homopolypropylene terminal blocks and a highly random highly elastic ethylene-propylene copolymer center block. Moreover, the infrared spectra indicated that the soluble portion of the polymer differed from the insoluble fraction in that atactic polypropylene was present. The striking difference between the physical properties of the soluble portion and on the other hand of the insoluble block copolymer demonstrate the desirable characteristics of the block copolymer having highly isotactic end blocks and highly random elastomeric center blocks.

EXAMPLE II

A block polymer having the structure polypropylene-(ethylene-propylene copolymer)-polypropylene was prepared in 1800 cc. heptane solvent utilizing as the catalyst components 10.8 millimoles gamma titanium trichloride per liter and 30.4 millimoles of diethylethoxy aluminum per liter. The polymerization was conducted at −2° C. at about 5 p.s.i.g. pressure. Six increments of propylene were added to the reaction spaced five minutes apart in an effort to improve the initiation of the catalyst, after which propylene was introduced into the reactor at a rate of 0.038 mole per minute for 30 minutes. This resulted in the formation of a homopropylene block in the amount of 0.84% w. solid based on the total reaction mixture. Thereafter the flow of propylene was continued at the same rate and ethylene was also introduced at a rate of 0.038 mole per minute. The copolymerization was continued for 60 minutes and resulted in a polymer product amounting to 5.50% by weight of the total reaction mixture. The third block, namely a terminal block of polypropylene was produced by introduction of only propylene at the original rate of 0.038 mole per minute until the intrinsic voscosity of the polymer was about 5.15 dl./g. (150° C., Decalin) and the total polymer weight was 8.5% by weight of the reaction mixture. Approximately 52% by weight of the entire polymer was soluble in normal heptane at room temperature. The physical properties of the whole polymer and the desired insoluble block copolymer were obtained, and are given below:

TABLE II

| Polymer | I.V., dl./g. | Tensile Properties at Break [1] | | | Modulus | | Tensile at 100° C., lbs./in.$^2$ |
| --- | --- | --- | --- | --- | --- | --- | --- |
| | | Strength, lbs./in.$^2$ | Elongation, percent | Set, percent | 300%, lbs./in.$^2$ | 500%, lbs./in.$^2$ | |
| Whole | 5.15 | 1,470 | 990 | 175 | 365 | 520 | |
| Insoluble | 5.56 | 5,200 | 600 | 145 | 1,170 | 2,370 | 1,160 |

[1] At room temperature.

Infrared spectra of the insoluble polymer indicated that it had highly isotactic homopolypropylene terminal blocks and a random highly elastic ethylene-propylene copolymer center block. Moreover, the infrared spectra indicated the soluble portion of the polymer differed from the insoluble fraction in that atactic polypropylene was present. An additional and important feature of the insoluble fraction comprises its exceptional retention of favorable physical properties at elevated temperatures. Thus, its tensile strength at 100° C. was 1160 lbs. per square inch.

Suitable alpha-olefins to be used in the formation of the block copolymer include propylene, 3-methyl butene-1, 4-methylpentene-1, heptene-1, octene-1, ethylene, decene-1 and dodecene-1. These are to be utilized in the formation of the several types of polymeric blocks in accordance with the species limitations expressed hereinbefore.

We claim as our invention:

1. As a new composition of matter, a block copolymer having the configuration

A-B-A wherein each A is an isotactic polymer block of an α-olefin of the group consisting of propylene and $C_{5-12}$ α-olefins, each block A having a crystallization temperature above about 125° C. and an intrinsic viscosity between about 0.05 dl./g. and 2.0 dl./g., and B is a highly random copolymer block of ethylene and at least one α-olefin having 3–12 carbon atoms per molecule and having an intrinsic viscosity between 0.7 and 5.0 dl./g., the intrinsic viscosities being measured in Decalin at 150° C., said copolymer block showing essentially only a single absorbance in the infrared wave length region associated with crystallinity of at least one of the monomers in said copolymer block, the block copolymer being substantially insoluble in normal heptane at 20° C.

2. A new composition of matter according to claim 1 wherein the block copolymer has the configuration
   polypropylene - (ethylene-propylene copolymer) - polypropylene wherein the polyproylene blocks are isotactic, having a crystallization temperature of about 125–200° C., and the copolymer block is highly randon, showing essentially only a single absorbance in the infared wave length region between about 13.4 and 14.2 microns, the block copolymer being substantially insoluble in normal heptane at 20° C.

3. A block copolymer according to claim 2 wherein the center copolymer block is elastomeric and comprises 30 to 90 weight percent of the copolymer.

4. A block copolymer according to claim 2 which is elastomeric and wherein the center copolymer block contains 20 to 90 weight percent ethylene.

5. A method of producing a block copolymer having a structure according to claim 1 which comprises:
   at a polymerization temperature between about −25° C. and 100° C.
   (a) first homopolymerizing an α-olefin of the group consisting of propylene and $C_{5-12}$ α-olefins by contact with a catalyst consisting essentially of gamma titanium trichloride and a dialkyl hydrocarbyloxy aluminum in a Ti:Al mol ratio between about 1:1 and 1:8 to an average intrinsic viscosity between about 0.05 dl./g. and 2.0 dl./g.;

(b) thereafter continuing polymerization by copolymerizing a mixture of ethylene and at least one α-olefin having 3–12 carbon atoms per molecule to an average intrinsic viscosity of this copolymer block between 0.7 and 5.0 dl./g., ethylene comprising between about 25% and about 85% of this center block;

(c) and thereafter continuing the polymerization by homopolymerizing an α-olefin of the group consisting of propylene and α-olefins having 5–12 carbon atoms per molecule to form the desired average molecular weight within range specified for the initial block.

6. A method according to claim 5 wherein
(a) the α-olefin homopolymerized in steps (a) and (c) is propylene;
(b) the olefins copolymerized in step (b) are ethylene and propylene;
(c) and the catalyst components are gamma titanium trichloride and diethylethoxy aluminum used in a Ti:Al mol ratio between about 1:2 and 1:4.

References Cited

UNITED STATES PATENTS

| | | | |
|---|---|---|---|
| 3,265,765 | 9/1966 | Holden et al. | 260—878 |
| 3,296,338 | 1/1967 | Jezl et al. | 260—878 |
| 3,301,921 | 1/1967 | Short | 260—878 |
| 3,326,883 | 6/1967 | Kelley et al. | 260—94.9 |
| 3,358,056 | 12/1967 | Renaudo | 260—878 |
| 3,378,606 | 4/1968 | Kontos | 260—878 |
| 3,378,608 | 4/1968 | Hassell | 260—878 |

MURRAY TILLMAN, Primary Examiner

JOHN T. GOOLKASIAN, Assistant Examiner

U.S. Cl. X.R.

252—429; 260—93.7, 94.9